March 7, 1950  G. R. WALLACE  2,499,434
RADIUS GAUGE
Filed Oct. 29, 1945

INVENTOR.
George R. Wallace
BY
Ralph L. Chappell
ATTORNEY

Patented Mar. 7, 1950 2,499,434

UNITED STATES PATENT OFFICE 2,499,434
RADIUS GAUGE

George R. Wallace, Lakewood, N. J.

Application October 29, 1945, Serial No. 625,415

8 Claims. (Cl. 33—185)

(Granted under the act of March 3, 1883, as amended April 30, 1928; 370 O. G. 757)

This invention relates to a lathe radius gauge for setting tool bits.

The object of this invention is to provide a gauge or guide that will insure rapid setting of a cutting tool for cutting concave or convex spherical surfaces.

Further objects and advantages of this invention, as well as its construction, arrangement and operation, will be apparent from the following description and claims in connection with the accompanying drawing, in which Fig. 1 is a top plan view of a radius gauge shown in conjunction with a tool for cutting a concave spherical surface;

Figure 1:
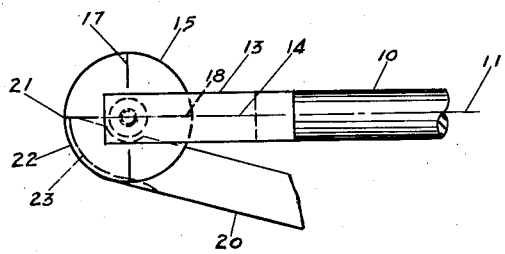

A cylindrical arbor 10 has a center line 11, which is coaxial with the lathe tailstock when the device is in use. Integral with the cylindrical arbor 10 is a vertical extension 12, which in turn has integrally therewith a horizontal extension 13, the center line 14 of the horizontal extension 13 being in the same vertical plane as the center line 11. For setting the cutting tool, a transparent disc 15 is provided, disc 15 being attached to the horizontal extension 13 by means of a screw 5 received threadedly by the horizontal extension 13 and carrying a sleeve spacer 16.

Inscribed on the disc 15 are two diameters 17 and 18, the diameter 18 being in the same vertical plane as the center line 11. It will be noted, too, that for correct operation the underside of disc 15 is located in the same horizontal plane as the center line 11.

In the operation of the device, the center line of the arbor 10, when inserted in the tailstock of the lathe, is coaxial with the lathe centers. With the disc located as described above, its center is located on the center line of the lathe centers, with its underside in the same horizontal plane as the lathe centers. A cutting tool 20 for cutting a concave spherical surface is then set with its tip 21 on the diameter 18 and its curved cutting edge 22 in registry with the circumference of the disc 15. In this connection, it may be noted that the cutting edge 22 slopes away from the tip 21 as at 23 to provide sufficient clearance during the cutting operation. With the tool 20 thus set, it is moved into contact with the work and the convex spherical surface turned.

Figure 3:
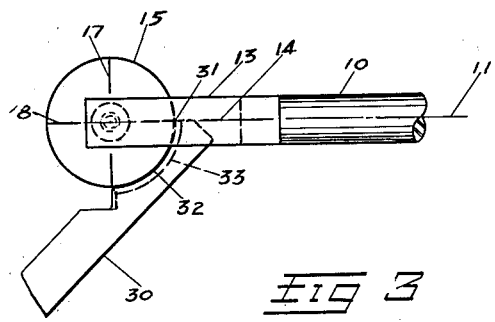
Fig. 3 is a top plan view of the radius gauge shown in conjunction with a tool for cutting a convex spherical surface.
Figure 2:
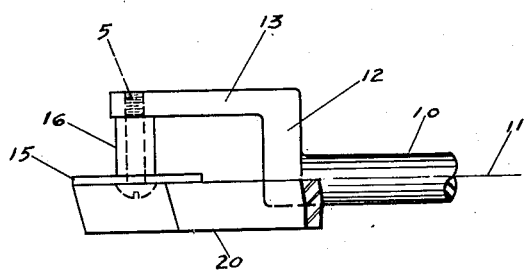
Fig. 2 is a front elevation of the gauge corresponding to Fig. 1.

Fig. 3 shows the use of the disc in conjunction with a cutting tool 30 for cutting a convex spherical surface. In this case the tip 31 is placed on the diameter 18 and the cutting edge 32 brought into registry with the circumference of the disc 15. The tool 30 is then moved into contact with the work and the convex spherical surface turned. It will be noted that the cutting edge 32 is inclined in a direction away from the work as at 33 to provide clearance.

It is to be understood in both operations described above that the radius of the disc 15 is the same as the radius of the spherical surface to be turned and that the arcuate length of either of the cutting tools 20 and 30 is the same as the arcuate length of the work. As illustrated, the cutting tools 20 and 30 have arcuate lengths equal to the arcuate length of a portion of the periphery of disc 15 lying between the adjacent ends of the two diametral lines 17 and 18. In this connection diameter 17 in Fig. 3 is used to indicate the proper setting for the inner ends of cutting edge 32.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A radius gauge for use with a lathe comprising a cylindrical arbor for insertion into the tailstock of the lathe, said arbor having a longitudinal center line, a vertical extension integral with said arbor, a horizontal extension having a center line, the center line of said horizontal extension being in the same vertical plane as the center line of said arbor, said horizontal extension being integral with said vertical extension, a sleeve spacer attached to said horizontal extension on the underside thereof, a transparent disc attached to said sleeve, said disc having two diameters inscribed thereon, said diameters being at right angles, one of said diameters being in the same vertical plane as the center line of said arbor, said sleeve and extensions being so constructed and arranged as to place the center of said disc on the center line of said arbor, and the underside of said disc in the same horizontal plane as the center line of said arbor, whereby when the center line of said arbor is coaxial with the lathe centers, the diameters and circumference of the disc may be used for setting a cutting tool ground on a radius the same as the radius of the disc.

2. A radius gage comprising an arbor, an offset extension thereon, and a disc having a plurality of inscribed diameters, said disc being mounted on said extension, the central axis of said disc and a face thereof intersecting the longitudinal center line of said arbor.

3. A radius gage comprising an arbor, an offset extension thereon, and a transparent disc having a plurality of inscribed diameters, said disc being mounted on said extension, the central axis of said disc and a face thereof intersecting the longitudinal center line of said arbor.

4. A radius gage comprising an arbor, an offset extension thereon, a sleeve spacer mounted on said extension normal to said arbor, and a transparent disc having a plurality of inscribed diameters, said disc being mounted on the end of said spacer distal said extension, the central axis of said disc and a face thereof intersecting the longitudinal center line of said arbor.

5. A radius gage comprising an arbor, an offset extension thereon, a sleeve spacer mounted on said extension normal to said arbor, and a transparent disc having a plurality of inscribed diameters, one of said diameters being in the same vertical plane as the longitudinal center line of said arbor and another of said diameters being normal thereto, said disc being mounted on the end of said spacer distal said extension, the central axis of said disc and a face thereof intersecting the longitudinal center line of said arbor.

6. A radius gage comprising an arbor, an offset extension thereon, a sleeve spacer mounted on said extension normal to said arbor, and a transparent disc having a plurality of inscribed diameters, one of said diameters being in the same vertical plane as the longitudinal center line of said arbor and another of said diameters being normal thereto, said disc being mounted on the end of said spacer distal said extension, the central axis of said disc and the face thereof distal said extension intersecting the longitudinal center line of said arbor.

7. A gage comprising an arbor, an offset extension thereon, and a plate mounted on said extension and having a periphery adapted to be disposed in registry with the cutting edge of a cutting tool, a face of said plate and a predetermined axis of said plate intersecting said face both intersecting the longitudinal center line of said arbor.

8. A gage comprising an arbor, an offset extension thereon, and a plate mounted on said extension and having a periphery adapted to be disposed in registry with the cutting edge of a cutting tool, a face of said plate and a predetermined axis of said plate intersecting said face both intersecting the longitudinal center line of said arbor, and means on said plate to indicate registry of said tool with said plate.

GEORGE R. WALLACE.

REFERENCES CITED

The following references are of record in the file of this patent:

UNITED STATES PATENTS

| Number | Name | Date |
|---|---|---|
| 135,185 | Way | Jan. 21, 1873 |
| 624,535 | Powel | May 8, 1899 |
| 888,826 | Kooken | May 26, 1908 |
| 1,493,813 | Heuser | May 13, 1924 |

FOREIGN PATENTS

| Number | Country | Date |
|---|---|---|
| 345,112 | Great Britain | Mar. 19, 1931 |